3,096,192
ASPHALT COMPOSITIONS HAVING REDUCED
STRIPPING TENDENCIES
Armin C. Pitchford, Bartlesville, Okla., assignor to Phillips
Petroleum Company, a corporation of Delaware
No Drawing. Filed Aug. 12, 1960, Ser. No. 49,130
7 Claims. (Cl. 106—281)

This invention relates to reducing the stripping tendencies of asphalt compositions. In another aspect, it relates to asphalt compositions, such as used in paving roads, containing novel anti-stripping agents. In another aspect, it relates to asphalt-coated mineral aggregate, the asphalt coating having a low-stripping tendency. In another aspect it relates to a method of improving the adhesive properties of asphalt compositions, such as used in coating mineral aggregate in the paving of roads.

In coating mineral aggregate with asphalt, for example in paving roads or the like, the asphalt often tends to strip from the aggregate in the presence of water. Such mineral aggregates exhibit a greater affinity for water than for the asphalt; thus, it is sometimes impossible to satisfactorily coat wet aggregate with asphaltic compositions. Even when the aggregate is already coated with asphalt, water or water vapor will slowly permeate the asphalt and loosen or strip the asphalt from the aggregate. As a result, the asphalt is not tenaciously held to the aggregate and rapid deterioration of the paving or surface composition results.

Accordingly an object of this invention is to reduce the stripping tendencies of asphalt compositions. Another object is to provide improved asphalt compositions, such as used in the paving of roads, containing novel anti-stripping agents, which prevent or substantially minimize the stripping of such asphalt compositions from surfaces coated therewith. Another object is to provide a method for improving the adhesive properties of asphalt compositions, such as that used in coating mineral aggregate, notwithstanding the initial presence of water in the aggregate or subsequent contact thereof with water after being coated with the asphalt composition. Further objects and advantages of this invention will become apparent to those skilled in the art from the following discussion and appended claims.

Briefly stated, the objects of this invention are achieved by incorporating in asphalt compositions, such as those used in coating mineral aggregate, an anti-stripping agent comprising an amine salt of asphaltene carboxylic acids, in an amount sufficient to reduce the stripping tendencies of such compositions in the presence of water. These novel anti-stripping agents can best be prepared by treating asphaltenes with nitric acid to produce asphaltene carboxylic acids, and then neutralizing these acids with amines to form the corresponding amine salts.

The terms "asphalt" or "asphaltic material" as used in this specification and in the appended claims are meant to cover dark brown to black liquid, semi-solid or solid cementitious mixtures of hydrocarbons of natural or pyrogenous origin, or a combination of both, which are completely or substantially soluble in carbon disulfide, and wherein bitumens are the sole or predominate constituent. Naturally occurring or native asphalts and pyrogenous asphalts useful in the practice of this invention include materials such as albertite, elaterite, gilsonite, grahamite, wurtzilite, Trinidad or Bermudez Lake asphalts, and those asphalts obtained by refining petroleum by distillation, precipitation, cracking, solvent extraction, or similar operations, for example, distillation residues, still bottoms, cracked residues, straight-run residues, asphaltic bitumens, blown asphalt, and the like.

The term "asphaltenes" as used in this specification and in the appended claims is meant to cover those constituents of asphalt which are soluble in carbon disulfide but insoluble in paraffin naphthas, n-pentane, n-hexane, n-heptane, petroleum ether, cyclopentane, and like light hydrocarbons, this asphaltic constituent having relatively high molecular weights (e.g., $10^3$–$10^5$) and a predominantly aromatic character.

The term "asphaltene carboxylic acids" as used in this specification and in the appended claims is meant to cover the acidic products produced by oxidation of the corresponding asphaltene precursor, such as by treating asphaltenes with nitric acid according to this invention, these acidic products being insoluble in hydrocarbons such as benzene and capable of being converted upon neutralization with amines to the corresponding hydrocarbon-soluble amine salts.

Asphalts having ring and ball softening points in the range of 60 to 350° F. are generally applicable in preparing the asphaltene carboxylic acids, those having softening points in the range of 100 to 250° F. being even more preferred.

Especially useful asphaltic materials for preparing the novel anti-stripping agents are those obtained from asphaltic crude oils, the residua products thereof having from 3 to 60 weight percent, preferably 15 to 25 weight percent, asphaltenes. Petroleum residuum which I have found to be particularly useful as starting material is that obtained by desalting, topping, and vacuum reducing Wafra crude oil, which residuum can be characterized as a 1025° F. residuum. Typical asphaltic starting materials will generally comprise 5 to 40 weight percent asphaltenes, 15 to 75 weight percent asphaltic resins, and 20 to 70 weight percent oily constituents.

The asphaltene constituent can be obtained from the asphalt by treating the latter so as to precipitate the asphaltene constituents, using for this purpose a paraffin liquid hydrocarbon such as n-pentane, n-hexane, n-heptane, octane, petroleum ether, petroleum naphthas, cyclopentane and the like, preferably a normal paraffin hydrocarbon having a total of 5 to 8 carbon atoms per molecule. This separation of the asphaltene constituent is essentially a solvent extraction step, resulting in the precipitation or flocculation of the insoluble, solid asphaltenes, the asphaltic resins and oily constituents being soluble in the paraffinic solvent. The ratio of solvent/asphalt can vary over a wide range, generally 5/1 to 100/1 and preferably about 10/1, the particular ratio used depending upon the nature of the asphalt, the particular solvent, and conditions of treatment. Temperatures during extraction will also vary and ambient temperatures as well as elevated temperatures can be used, e.g., up to 415° F. and preferably up to 350° F. The resulting insoluble asphaltenes can be separated from the solvent and other soluble asphaltic material by decantation, filtration, and the like, the insoluble asphaltenes settling in one or two hours or after a number of days. The settling rate can be accelerated by applying a pressure, e.g., 375 p.s.i. at 350° F.

The insoluble asphaltenes can be dried and comminuted, or dispersed or slurried in a suitable, non-oxidizable diluent such as water, paraffins such as pentane, hexane, heptane, octane, etc., and commercially available highly branched paraffins, such as Soltrols. Generally, the asphaltenes will have specific gravities (60/60° F.) in the range of 1.1 to 1.3, preferably 1.15 to 1.2.

The asphaltene starting material can be passed in comminuted form or as a dispersion in a suitable inert diluent to a suitable oxidation zone, such as a stirred reactor, where the asphaltenes are oxidized with nitric acid. The reactor can be externally heated or cooled by means of a suitable heat exchange medium, the reaction temperature depending among other things on the concentration of the nitric acid used. The conditions used are favorable to the production of asphaltene carboxylic acids, and a minimum, if any, of nitrated products are produced.

The nitric acid used in this oxidative process will generally have a concentration of from 10 to 70 weight percent, preferably 50 to 60 weight percent. The nitric acid/asphaltenes ratio can vary over a wide range, but generally will be in the range of from 1/2 to 10/1, on an anhydrous basis. Temperatures during treatment will also vary over a wide range, the particular temperature depending on the concentration and amount of nitric acid, the pressure employed (which can be atmospheric or super-atmospheric), the nature of the asphaltenes, and other factors. Generally elevated temperatures will be used in the range of 150° to 350° F., preferably 200° to 250° F. The oxidation reaction period will also vary, and generally will be in the range of from 3 to 30 hours, preferably 5 to 10 hours. The temperature of the oxidation reaction can be controlled by the serial addition of the nitric acid and also by circulating a cooling or heating medium in the external jacket surrounding the oxidation reactor. The reaction mass is continuously agitated by means of a paddle or the like, and the bottoms of the reactor preferably are continuously withdrawn and recycled to the top of the reaction zone to insure complete and quick oxidation. During the reaction, volatile gases, such as nitrogen oxide, and by-products such as low molecular weight aliphatic monocarboxylic acids, e.g., those having 1–5 carbon atoms per molecule such as formic, acetic, butyric, propionic, valeric, etc., are produced and they can be vented from the reactor. If desired the reaction can be stopped by the addition of water. The oxides of nitrogen which are produced can be collected and introduced again into the reactor to obtain full use of their oxidative properties.

The resulting effluent of hydrocarbon insoluble asphaltene carboxylic acids and soluble, low molecular weight acids will generally have the nature of a slurry, depending on the nature of asphaltenes, the degree of oxidation, etc. The oxidation effluent can be subjected to suitable separation procedures to recover the insoluble asphaltene carboxylic acids for use as such, or the oxidation effluent can be directly neutralized with a basic amine neutralizing agent. Alternatively, the oxidation reaction mixture can be first preliminarily filtered by means of filtration or the like and the filtered solid, water- and hydrocarbon-insoluble asphaltene carboxylic acids washed and neutralized.

The carboxylic acids produced by the oxidative treatment of asphaltenes can be neutralized with any basic amine neutralizing agent having a replaceable hydrogen. Such amines include primary and secondary amines, as well as diamines. In particular, I prefer to use fatty amines and diamines having at least one aliphatic substituent with a total of 1 to 20 carbon atoms, preferably 12 to 18 carbon atoms. Aliphatic amines representatively include those having the general formulas $RNH_2$ and $(R)_2NH$, where R is an aliphatic radical derived from a fatty acid having 8 to 22 carbon atoms. Diamines which can be used representatively include those of the general formula $RNH(CH_2)_3NH_2$, where R represents an aliphatic radical derived from a fatty acid having 8 to 22 carbon atoms per molecule, these diamines also being known as N-alkyltrimethylene diamines. These amines are commercially available and are sold under the trademarks Armeen, Alamines, and Duomeens. Representative amines which can be used in neutralizing the asphaltene carboxylic acids representatively include primary capryl amine, primary caproyl amine, primary myristyl amine, primary oleyl-linoleyl amine, primary lauryl amine, primary oleyl amine, primary tallow amine, primary stearyl amine, primary palmityl amine, primary linoleyl amine, primary coconut oil amine, primary soy bean oil amine, primary cottonseed oil amine, secondary lauryl amine, secondary myristyl amine, secondary palmityl amine, secondary stearyl amine, secondary oleyl-linoleyl amine, trilauryl amine, tricoco amine, tricaprylyl amine, N-coco-1,3-propylene diamine, N-tallow-1,3-propylene diamine, and the like, including mixtures thereof.

The amine neutralizing agent can be added to the oxidation reactor when the oxidation is completed, or the oxidation reaction mixture can be passed to a suitable holding vessel and neutralized there with the basic amine neutralizing agent, a slight excess of the neutralizing agent being used to insure a product having a pH of about 7 to 10. This neutralizing step can be carried out over a wide temperature range, and generally will be in the range of 100 to 300° F. and preferably 200 to 240° F. Repeated amounts of the neutralizing agent can be added so as to insure complete neutralization. After neutralization, the pH of the neutralized mixture can be adjusted. The neutralized mixture can be allowed to settle and then separated, for example by decantation, centrifugation, filtration, or the like, to separate the asphaltene carboxylic acid amine salts.

Following neutralization, the recovered hydrocarbon soluble asphaltene carboxylic acid amine salts can be dried, for example by flashing or by use of a suitable drum drier, and the dry product crushed or otherwise comminuted. The neutralized product will generally have a brown to dark black color and will have a friable consistency, and it will also be relatively neutral.

The amount of neutralized asphaltene carboxylic acid anti-stripping agent added to asphalt to reduce the stripping tendencies thereof will vary and be dependent on several variables, such as the nature of the asphalt composition desired to be treated, the nature of the mineral aggregate to be coated with the asphalt, and other factors that can be determined by those skilled in the art by means of simple and known routine tests. Generally, the amount of anti-stripping agent incorporated in the asphalt coating composition, stated functionally, will be that amount sufficient to reduce the stripping tendency of the asphalt coating composition. For most applications, the amount of anti-stripping agent will be in the range of from about 0.1 to 5 weight percent, preferably about 0.5 to 3 weight percent, based on the asphalt composition. The anti-stripping agent of this invention can be employed either as the pure material or in the form of a concentrate or solution either in a suitable organic solvent, such as kerosene, naphtha, benzene, or the like, or even a cutback or penetration grade asphalt. The anti-stripping agent can be incorporated into the asphalt composition by any known and conventional procedures, preferably by mixing it with the asphalt before it is used for coating purposes. Those skilled in the art upon becoming acquainted with this invention will readily be able to incorporate the anti-stripping agent into the asphalt in any manner desired. The asphalts which can be treated with the novel anti-stripping agents of this invention include any of those now known and useful in coating mineral aggregate or the like. Such asphalts representatively include cutback asphalts, emulsified asphalts, asphalt cements, asphalt fillers, asphalt blanks, and the like.

Mineral aggregate which can be coated with the novel strip-resistant asphalt compositions of this invention include any of those now known to be useful for this purpose, including waste mineral materials such as slags, but more generally mineral aggregates of natural origin such as sand, gravel, shell, broken stone, and combinations thereof. In addition, all the various kinds of rocks native to the localities where the roads or paving are to be built can be used, for example limestone, dolomite, silica, rhyolite, caliche, and sedimentary, metamorphic or igneous rocks or various other kinds generally used in road building. The amount of aggregate coated, or the amount of asphalt used in coating such aggregates, will also vary over a wide range and depend upon such factors as the type of coated aggregate desired, the type and/or amount of asphalt used, etc., the amount of asphalt generally being in the range from about 2 to 60 weight percent of the coated composition.

The following example is set forth to further illustrate the objects and advantages of this invention; however, it should be understood that the various ingredients, amounts of ingredients, and other conditions, should not be construed so as to unduly limit this invention.

reactor. Following the oxidative treatment of the asphaltenes, the reaction mass in each run was filtered to obtain a solid residue comprising water- and hydrocarbon-insoluble asphaltene carboxylic acids (plus unreacted material and some coke) and a filtrate comprising water soluble volatile acids comprising low molecular weight monocarboxylic acids, e.g., 1 to 5 carbon atoms (formic acid through valeric acid). Conditions of oxidation and results of these runs are summarized in Table III.

Table III

|  | Runs | | | | | | | | | |
|---|---|---|---|---|---|---|---|---|---|---|
|  | 1 | 2 | 3 | 4 | 5 | 6 | 7 | 8 | 9 | 10 |
| Asphaltenes, gms | 25 | 25 | 25 | 25 | 25 | 25 | 25 | 25 | 25 | 25 |
| Nitric acid/asphaltenes ratio | 7.5 | 3.1 | 1.5 | 1.7 | 1.7 | 1.7 | 1.6 | 1.8 | 1.8 | 0.94 |
| Nickel naphthenate,ᵃ wt. percent | 0 | 0 | 0 | 1.0 | 5.0 | 10.0 | 5 | 5 | 5 | 0 |
| Oxidation time, hrs | 5 | 5 | 5 | 5 | 5 | 5 | 10 | 15 | 20 | 6.5 |
| Temperature, ° F | 230 | 220 | 214 | 214 | 214 | 214 | 214 | 213 | 213 | 210 |
| Nitric acid consumed, gms | 93.5 | 20.4 | 14.2 | 10.0 |  | 30.9 | 14.5 | 18.7 | 21.3 | 8 |
| Yields, wt. percent: |  |  |  |  |  |  |  |  |  |  |
| Solid acids ᵇ | 108.8 | 116.8 | 106.8 | 108.0 | 104.4 | 116.8 | 87.5 | 110.8 | 112.4 |  |
| Volatile acids ᶜ | 32.0 | 28.0 | 36.0 | 12 | 32 | 40 | 35 | 24 | 28 | 20 |

ᵃ Used as oxidation catalyst, wt. percent based on asphaltenes.
ᵇ Comprises water insoluble material obtained on filtering reaction mass.
ᶜ Comprises water soluble material obtained on filtering reaction mass.

EXAMPLE I

In this example there is described the preparation of suitable asphaltene starting material which can be used to prepare the novel anti-stripping agents of this invention.

A Wafra crude oil was desalted, topped, and vacuum reduced to yield a 1025° F.+ residuum having the properties set forth in Table I.

Table I

| | |
|---|---|
| Volume percent | 33.0 |
| Weight percent of crude | 37.0 |
| Specific gravity, 60/60° F | 1.0158 |
| API gravity, 60/60° | 7.8 |
| Viscosity, SFS, 210° F | 433 |
| Penetration, 100/5/77° F., mm./10 | 430 |
| Softening point, R. & B., ° F | 93 |
| Asphaltenes (pentane insolubles), wt. percent | 14.46 |

Asphaltenes were separated from the above-described Wafra 1025° F.+ in a series of batch precipitations wherein a plurality of 4-gallon charges of the residuum were solubilized by adding about an equivalent volume of commercial grade n-pentane. After mixing the asphaltic residuum with the solvent, and allowing the mixture to settle, the n-pentane solubles were decanted and filtered without disturbing the settled asphaltenes. The asphaltenes were then slurried with more pentane, filtered, reslurried, and washed with additional portions of solvent, the first washings being added to the original filtrate of pentane solubles. The filtered asphaltenes from each of the batch separations were combined and dried in an oven at 180° F. to yield a dry asphaltene product. Conditions and results of extraction are summarized in Table II. This asphaltene product was used in Example II.

Table II

| | |
|---|---|
| Weight of asphalt, lbs | 375.39 |
| Volume of asphalt, gals | 44.43 |
| Volume of n-pentane, gals | 444.2 |
| Solvent/asphalt ratio | 10/1 |
| Temperature of extraction, ° F | 78–93 |
| Settling time, hrs | 16–72 |
| Asphaltenes yield, lbs | 54.69 |
| Asphaltenes yield, wt. percent | 14.5 |

EXAMPLE II

In this example, a number of runs were made by oxidizing asphaltenes with 15 percent nitric acid in a stirred reactor.

The data of Table III show that best yields are obtained with higher nitric acid/asphaltenes ratios, e.g., 7.5, and that such results can be obtained without an oxidation catalyst.

EXAMPLE III

In this example, 300 grams of the asphaltenes prepared according to Example I were reacted with 1050 ml. of 50 percent nitric acid, the nitric acid/asphaltenes ratio being 3/1. The mixture was refluxed for 6.5 hours at 220° to 240° F., heated for one hour at 225° F., filtered hot and washed with water. The residue was then reacted with an additional 1400 ml. of 50 percent nitric acid, refluxed for one hour, heated for two hours at 150° to 175° F., refluxed for four hours, cooled to 150° F. and filtered. Filtration yielded a solid reaction product and a filtrate. The latter was made alkaline with sodium hydroxide to prevent volatilization of low molecular weight acids; the odor of butyric acid was very predominant. The filtered insoluble residue was washed with about 3 liters of water until the washings were essentially clear, though still acid to pH paper. The residue was dried in an oven and amounted to about 331 grams.

The resulting asphaltene carboxylic acid product was then subjected to various analytical procedures to determine the nature and composition of the same. Elemental analysis of this product is summarized in Table IV.

Table IV

| | Wt. percent |
|---|---|
| Carbon | 57.0 |
| Hydrogen | 4.2 |
| Oxygen (by difference) | 30.0 |
| Nitrogen | 3.1 |
| Sulfur | 5.7 |

Titration of the above-mentioned asphaltene carboxylic acid product according to ASTM Procedure D 664–49 resulted in a total acid number of 202 mg. KOH per gram, this value as well as the titration curve indicating that the product comprises predominantly carboxylic acids.

Characterization of the above-mentioned asphaltene carboxylic acid product according to "The Systematic Identification of Organic Compounds," by R. L. Shriner and R. C. Fuson, third edition, Wiley and Sons, Inc., New York, 1948, showed that the product belongs in Class $A_1$, this class comprising acids and negatively substituted phenols.

Analysis of the above-mentioned asphaltene carboxylic acid product by means of infra-red spectra qualitatively indicated the presence of both —COOH and —NO$_2$.

The above analytical results show conclusively that the anti-stripping agents of this invention are amine carboxylic derivatives of carboxylic acids, with a minimum, if any, of nitration products.

EXAMPLE IV

Asphaltene carboxylic acids, in the amount of 10 grams and prepared according to Example III, were neutralized with 7 grams of trimethylene coco diamine dissolved in benzene. The resulting neutralized asphaltene carboxylic acid anti-stripping agent was added to a cutback asphalt SC–2 (a 65% solution of 100% penetration asphalt in a light gas oil distillate) to give a 1% solution of the anti-stripping agent, after removal of benzene. Limestone aggregate in the amount of 101 grams was coated with 5 grams of the cutback asphalt containing said neutralized asphaltene carboxylic acid. The coated aggregate was soaked in water for three hours at 77° F. After coating, the aggregate-asphalt mixture was cured for 18 hours at 100° F. The cured coated aggregate was added to 200 ml. water containing enough NaCl to raise the specific gravity of the solution above 1 to aid in the recovery of the stripped asphalt, and the mixture boiled for 3 to 5 minutes, and thereafter cooled to 180° F. with occasional stirring to displace any stripped asphalt to the surface of the liquid. The mixture was then placed in an oven at 180° F. and kept there for four hours, after which it was removed and cooled to room temperature. That which had been stripped was removed from the surface of the mixture, dissolved in benzene, filtered, stripped of benzene, and then weighed to determine the amount of asphalt stripped from the composition. Only 23.8 percent of the asphalt was stripped from the aggregate as determined by this procedure. Contrariwise, limestone aggregate coated in a similar way with the same cutback asphalt, without any anti-stripping agent added thereto, and subjected to the same conditions, resulted in 44.4 weight percent of the original asphalt stripped.

Various modifications and alternatives of this invention will become apparent to those skilled in the art from the foregoing discussion and examples, and it should be understood that this invention is not to be unduly limited to that set forth herein for illustrative purposes.

I claim:

1. An asphalt composition having a low stripping tendency, comprising asphalt and an anti-stripping agent consisting essentially of a salt of asphaltene carboxylic acids and an amine selected from the group consisting of $RNH_2$, $(R)_2NH$, and $RNH(CH_2)_3NH_2$, where R is an aliphatic radical derived from a fatty acid having 8 to 22 carbon atoms per molecule, the amount of said agent in said composition being sufficient to maintain the low stripping tendency thereof.

2. An asphalt composition having a low stripping tendency, comprising asphalt and an anti-stripping agent consisting essentially of a material prepared by oxidizing asphaltenes with nitric acid and neutralizing the resulting asphaltene carboxylic acids with a basic amine to form the corresponding amine salt, said amine being selected from the group consisting of $RNH_2$, $(R)_2NH$, and $RNH(CH_2)_3NH_2$, where R is an aliphatic radical derived from a fatty acid having 8 to 22 carbon atoms per molecule, the amount of said agent in said composition being sufficient to maintain the low stripping tendency thereof.

3. An asphalt composition according to claim 2 wherein said composition contains from about 0.1 to 5 weight percent of said agent.

4. An asphalt composition according to claim 2 wherein said basic amine neutralizing agent is trimethylene coco diamine.

5. An asphalt-coated mineral aggregate composition, comprising mineral aggregate coated with an asphalt composition containing an anti-stripping agent consisting essentially of a salt of asphaltene carboxylic acids and an amine selected from the group consisting of $RNH_2$, $(R)_2NH$, and $RNH(CH_2)_3NH_2$, where R is an aliphatic radical derived from a fatty acid having 8 to 22 carbon atoms per molecule, the amount of said agent in said composition being sufficient to maintain the low stripping tendency thereof.

6. A method of reducing the stripping tendency of an asphalt composition from a mineral surface to which it is applied, comprising the steps of mixing an asphalt with an asphalt composition containing an anti-stripping agent consisting essentially of a salt of asphaltene carboxylic acids and an amine selected from the group consisting of $RNH_2$, $(R)_2NH$, and $RNH(CH_2)_3NH_2$, where R is an aliphatic radical derived from a fatty acid having 8 to 22 carbon atoms per molecule, the amount of said agent in said composition being sufficient to maintain the low stripping tendency thereof.

7. An asphalt composition according to claim 2 wherein said asphaltenes are obtained by solvent extraction of a 1025° F.+ residuum obtained by desalting, topping, and vacuum reducing Wafra crude oil.

References Cited in the file of this patent

UNITED STATES PATENTS

| | | |
|---|---|---|
| 2,663,648 | Jelling | Dec. 22, 1953 |
| 2,737,509 | Jelling | Mar. 6, 1956 |

UNITED STATES PATENT OFFICE
CERTIFICATE OF CORRECTION

Patent No. 3,096,192                                        July 2, 1963

Armin C. Pitchford

It is hereby certified that error appears in the above numbered patent requiring correction and that the said Letters Patent should read as corrected below.

Column 8, line 36, strike out "asphalt composition containing an".

Signed and sealed this 3rd day of March 1964.

(SEAL)
Attest:

ERNEST W. SWIDER
Attesting Officer

EDWIN L. REYNOLDS

Acting Commissioner of Patents